United States Patent [19]

Yabe et al.

[11] Patent Number: 4,567,413

[45] Date of Patent: Jan. 28, 1986

[54] METHOD AND DEVICE FOR CONTROLLING POWER STEERING APPARATUS

[75] Inventors: Hideo Yabe, Hiki; Ichiro Koike, Higashimatsuyama, both of Japan

[73] Assignee: Jidosha Kiki Co., Ltd., Tokyo, Japan

[21] Appl. No.: 619,873

[22] Filed: Jun. 12, 1984

[30] Foreign Application Priority Data

Jun. 28, 1983 [JP] Japan ................. 58-116635

[51] Int. Cl.[4] ............................... H02P 7/29
[52] U.S. Cl. ..................... 318/489; 318/68; 318/139; 318/472; 180/6.28; 180/79.1; 364/185
[58] Field of Search ............ 318/34, 68, 113, 139, 318/255, 472, 489; 180/6.2, 6.24, 6.26, 6.28, 65.1, 65.2, 142, 79.1; 364/185

[56] References Cited

U.S. PATENT DOCUMENTS

| | | | |
|---|---|---|---|
| 3,665,399 | 5/1972 | Zehr et al. | 364/185 X |
| 4,392,540 | 7/1983 | Michio et al. | 180/142 |
| 4,476,529 | 10/1984 | Nakamura et al. | 180/142 X |
| 4,476,677 | 10/1984 | Hanshaw | 91/5 X |
| 4,478,595 | 10/1984 | Hayakawa et al. | 474/109 |

FOREIGN PATENT DOCUMENTS

| | | | |
|---|---|---|---|
| 2758308 | 7/1979 | Fed. Rep. of Germany | 180/79.1 |
| 55-76760 | 6/1980 | Japan | 180/79.1 |

Primary Examiner—William M. Shoop, Jr.
Assistant Examiner—Bentsu Ro
Attorney, Agent, or Firm—Townsend & Townsend

[57] ABSTRACT

A method and device for controlling a power steering apparatus for performing power steering by controlling a rotational speed of a motor-driven oil pump, wherein an alarm signal is generated when the power steering apparatus is overloaded, and a current is not supplied to a motor for a predetermined period of time when the power steering apparatus is overloaded.

6 Claims, 13 Drawing Figures

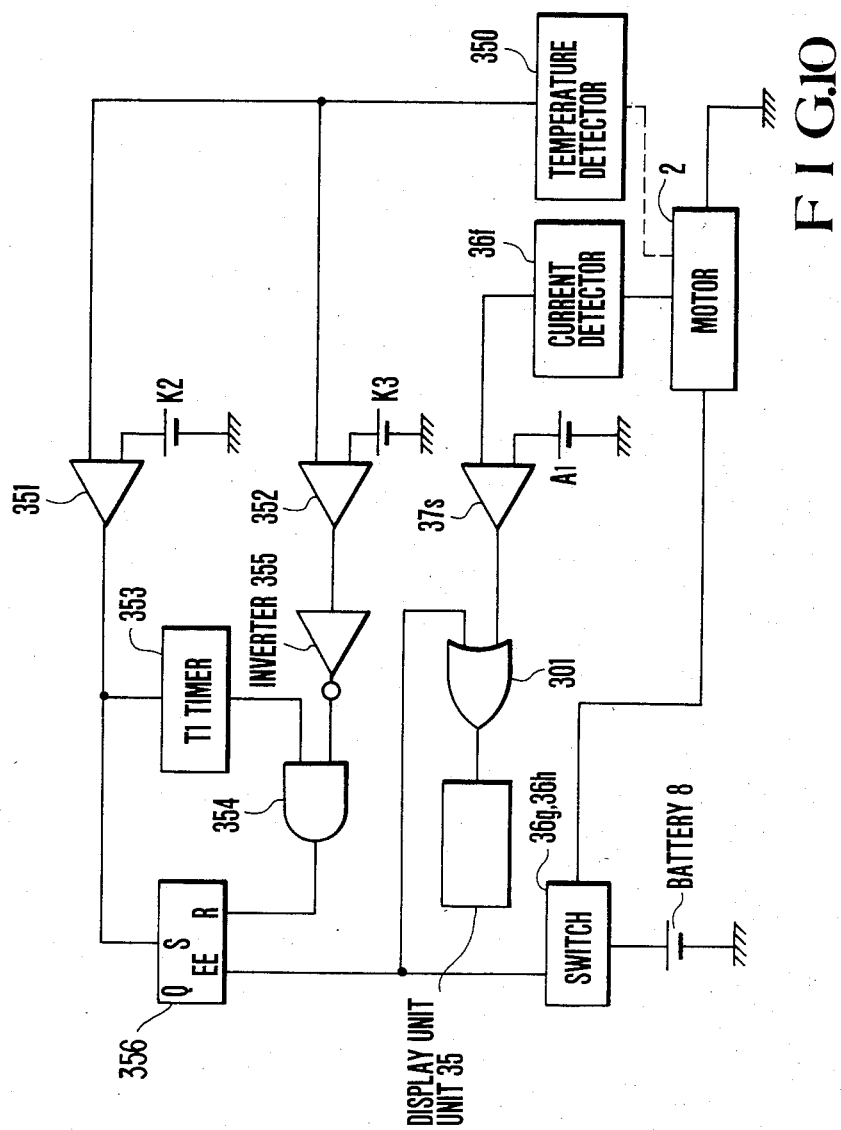
F I G.10

METHOD AND DEVICE FOR CONTROLLING POWER STEERING APPARATUS

BACKGROUND OF THE INVENTION

The present invention relates to method and device for controlling a power steering apparatus wherein the power steering apparatus can be free from trouble even when it is abnormally operated for a long period of time.

Automatic transmission vehicles have recently become prevalent in favor of a light steering force. A power steering apparatus is generally controlled such that a rotational speed of a motor-driven oil pump changes in accordance with a vehicle speed or a steering angle so as to control an oil flow rate. In this case, an output from the power steering apparatus is inversely-proportional to the vehicle speed and is proportional to the steering angle. However, maximum output is not maintained for a long period of time in normal operation. In this sense, the power steering apparatus need not have a long-term maximum output rating for continuously generating the maximum output, but can have a short-term maximum output rating for generating the maximum output for only a required period of time. When the short-term maximum output rating is employed, a compact power steering apparatus can be provided, resulting in an economic advantage. Therefore, most of the conventional power steering apparatuses have a short-term maximum output rating.

However, when the steering wheel is subjected to stationary swing and is kept in this state for a long period of time, the power steering apparatus in this abnormal operation state is subjected to overload which it cannot withstand, resulting in trouble.

SUMMARY OF THE INVENTION

It is, therefore, a principal object of the present invention to provide a method and device for controlling a power steering apparatus of short-term maximum output rating so as to prevent trouble of the power steering apparatus even if the power steering apparatus is kept operated in an abnormal state for a long period of time.

According to an aspect of the present invention, there is provided a method of controlling a power steering apparatus for performing power steering by controlling a rotational speed of a motor-driven oil pump, comprising the steps of: generating an alarm signal when the power steering apparatus is overloaded; and inhibiting the supply of a current to a motor for a predetermined period of time when the power steering apparatus is overloaded.

According to another aspect of the present invention, there is provided a device for controlling a power steering apparatus, comprising: first detecting means for detecting that a motor is imposed with a high load; second detecting means for detecting that said motor is imposed with an overload; an alarm unit for generating an alarm in response to an output from said first detecting means; and controlling means for inhibiting supply of a current to said motor for a predetermined period of time upon reception of an output from said second detecting means.

Other objects, features and advantages of the present invention will be apparent from the detailed description taken in conjunction with the accompanying drawings.

BRIEF DESCRIPTION OF THE DRAWINGS

FIG. 10, shows function blocks for performing the same operation as in FIGS. 9A and 9B.

DETAILED DESCRIPTION OF THE PREFERRED EMBODIMENTS

The present invention will be described in detail with reference to the accompanying drawings.

Figure 1:
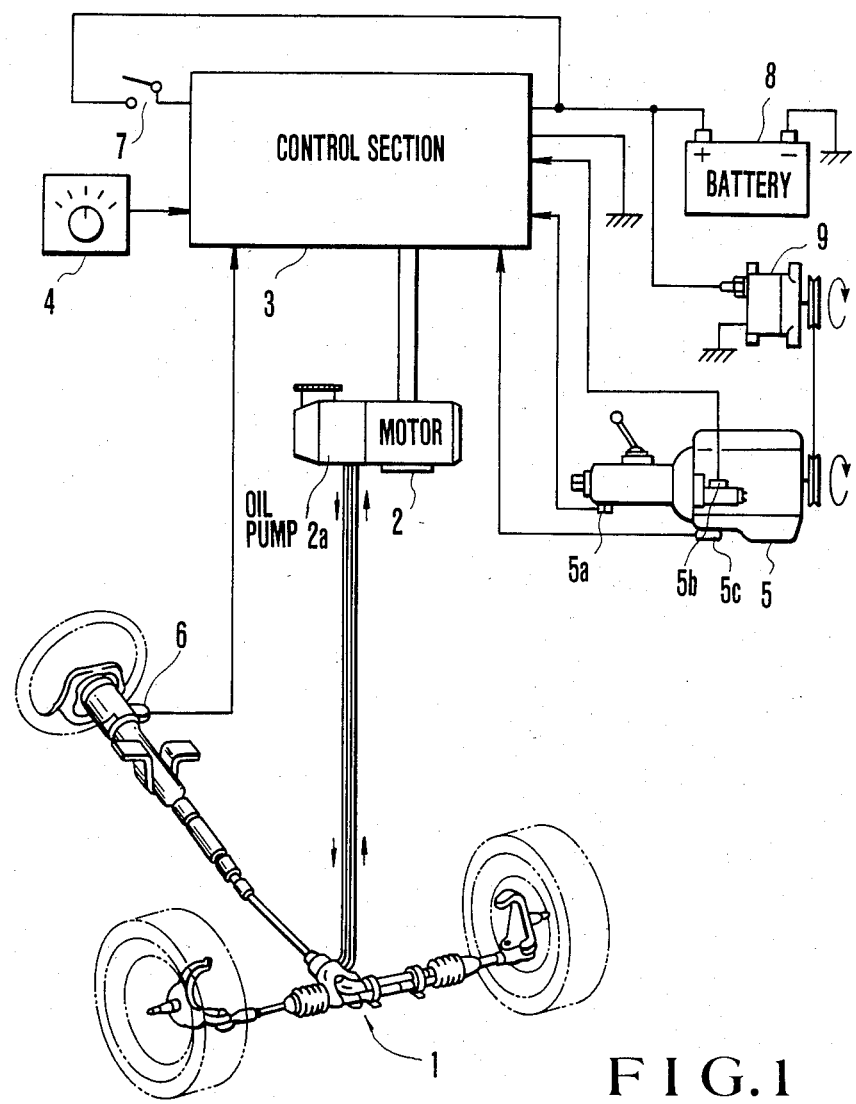
FIG. 1 is a schematic view showing the overall configuration of a power steering apparatus.
Figure 2:
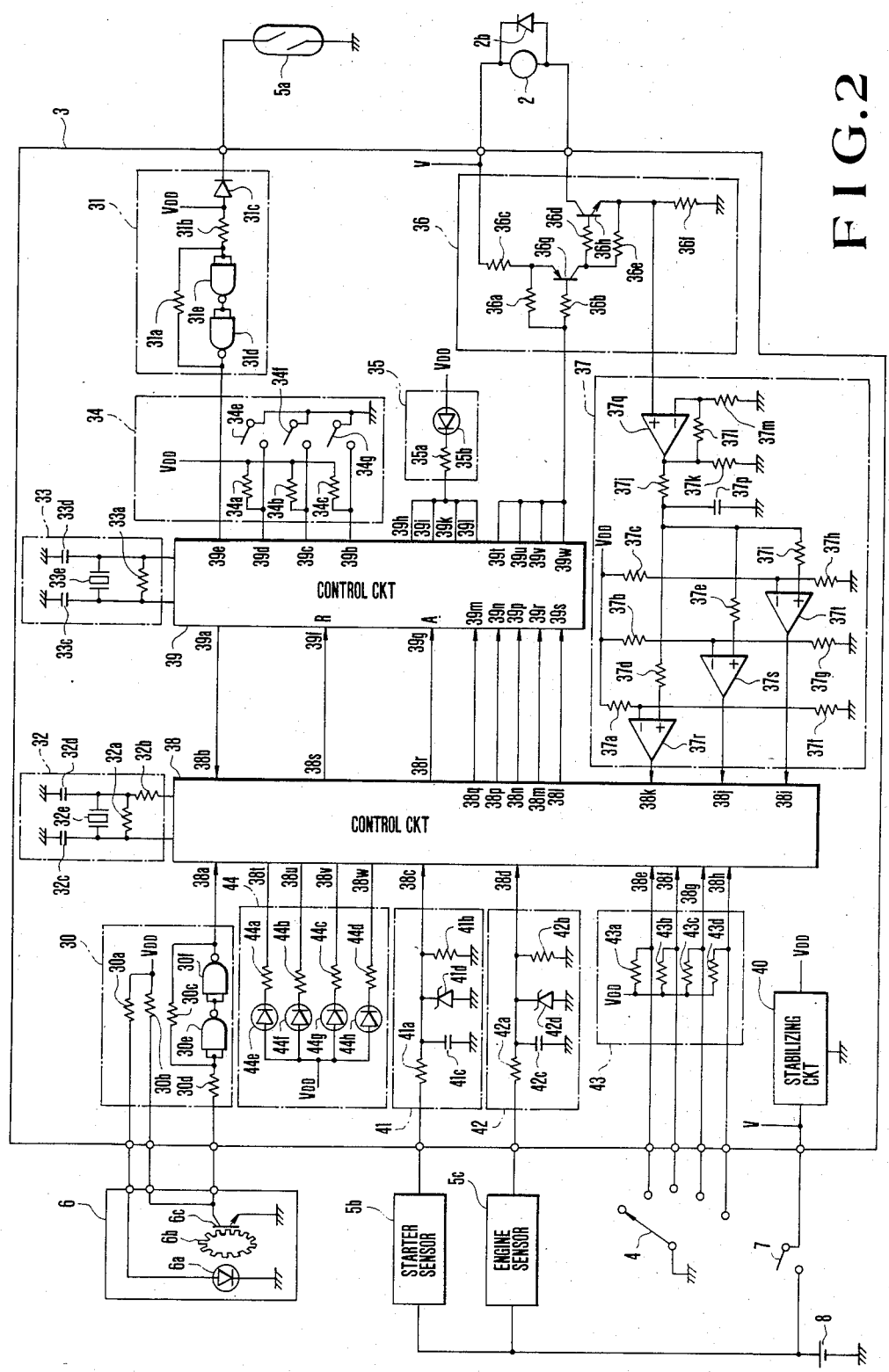
FIG. 2 is a circuit diagram of a control section 3 shown in FIG. 1.

FIG. 1 is a schematic view showing the overall configuration of a power steering apparatus. Referring to FIG. 1, reference numeral 1 denotes a steering section; 2, a motor for driving an oil pump 2a; 3, a control section; 4, a selection switch for selecting steering characteristics; 5, an engine; 5a, a speed sensor; 5b, a starter sensor; 5c, an engine sensor; 6, a steering sensor; 7, an ignition sensor; 8, a battery; and 9, an alternator. Referring to FIG. 2, the steering sensor 6 comprises a light-emitting diode 6a, a slit disk 6b and a phototransistor 6c. The steering sensor 6 generates pulses the number of which is proportional to a steering angle. The starter sensor 5b receives a voltage from the battery 8 when an engine starter motor (not shown) is operated. The voltage from the battery 8 is applied to the engine sensor 5c while the engine is operated. A diode 2b connected in parallel with the motor 2 serves as a transient voltage absorbing diode. The control section 3 comprises waveform shapers 30 and 31, oscillators 32 and 33, a frequency division ratio setting circuit 34, an alarm indicator 35, a switching circuit 36, a current discriminator 37, control circuits 38 and 39, stabilizing circuits 40, 41 and 42, a pull-up circuit 43, and an indicator unit 44 for indicating the steering characteristics.

The waveform shaper 30 comprises resistors 30a to 30d and NAND gates 30e and 30f. The waveform shaper 31 comprises resistors 31a and 31b, a diode 31c, and NAND gates 31d and 31e. The oscillator 32 comprises resistors 32a and 32b, capacitors 32c and 32d and a ceramic oscillator 32e, and the oscillator 33 comprises a resistor 33a, capacitors 33c and 33d, and a ceramic oscillator 33e. The frequency division ratio setting circuit 34 comprises resistors 34a to 34c and switches 34e to 34g. The circuit 34 controls the switches 34e to 34g to determine the frequency division ratio of the frequency divider built into the control circuit 39 so as to prevent the number of pulses per unit travel distance supplied from a terminal 39a from being changed according to the type of vehicle. As a result, the number of pulses per unit travel distance can be given to be constant irrespective of different types of vehicle. The alarm indicator 35 comprises a resistor 35a and a light-emitting diode 35b. The switching circuit 36 comprises resistors 36a to 36f and transistors 36g and 36h. The current discriminator 37 comprises resistors 37a to 37m, a capacitor 37p, an amplifier 37q, and comparators 37r to 37t. The current discriminator 37 discriminates whether or not a current flowing through the motor 2 corresponds to one of three preset values. The control circuit 38 performs processing (to be described later) of signals supplied to terminals 38a to 38k thereof and generates a 5-bit parallel signal, bits of which respectively appear at terminals 38l, 38m, 38n, 38p and 38q. The control circuit 38 also generates an alarm signal and a reset signal from terminals 38r and 38s, as needed. A zero level signal for indicating a steering characteristic appears at any one of terminals 38t to 38w of the control circuit 38. The control circuit 39 divides the frequency of the signal supplied to a terminal 39e at a frequency division ratio represented by a signal supplied to terminals 39b to 39d, and supplies a frequency-divided signal to the terminal 39a. When a signal is supplied to a terminal 39f, the control circuit 39 is reset. When a terminal 39g of the control circuit 39 receives a signal, a zero level signal appears at terminals 39h to 39l. The control circuit 39 also generates a duty changing signal at terminals 39t to 39w in response to the signals supplied to terminals 39m to 39s. The stabilizing circuits 40 to 42 stabilize the input voltage at a voltage of 5 V. The stabilizing circuit 41 comprises resistors 41a and 41b, a capacitor 41c and a Zener diode 41d. The stabilizing circuit 42 comprises resistors 42a and 42b, a capacitor 42c and a Zener diode 42d. The pull-up circuit 43 comprises resistors 43a to 43d. The indicator unit 44 comprises resistors 44a to 44d and light-emitting diodes 44e to 44h. The indicator unit 44 indicates steering characteristics manually selected by the switch 4 or automatically selected by the control circuit 38. Selection by the switch 4 has priority over selection by the control circuit 38.

Figure 3:
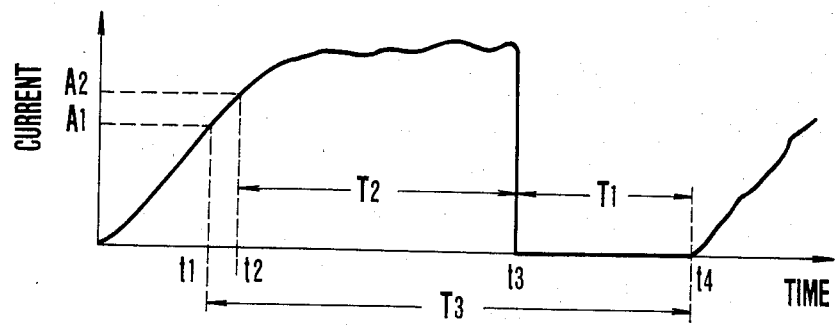
FIG. 3 is a graph showing the motor current in the apparatus as a function of time when a method of controlling the apparatus is applied according to an embodiment of the present invention.

FIG. 3 is a graph showing the motor current waveform when the power steering apparatus is arranged using a method of the present invention. The time is plotted along the abscissa, and the current is plotted along the ordinate. In order to obtain the characteristics in FIG. 3, the control section 3 of FIG. 2 is operated as follows.

When a current flowing through the motor 2 exceeds A1, the control section 3 determines that the motor 2 is imposed with a high load and causes the alarm indicator 35 to be turned on. Furthermore, when the current flowing through the motor 2 exceeds A2, and this state continues for a time interval T2, the control section 3 determines that the motor 2 is imposed with an overload and then cuts off the current supplied to the motor 2 for a time interval T1.

Since the high-load state is detected from time t1 and the overload state is detected at time t3, the current is stopped. The current is supplied again from time t4. In this case, the alarm indicator 35 is kept ON for a time interval T3.

Figure 4A:
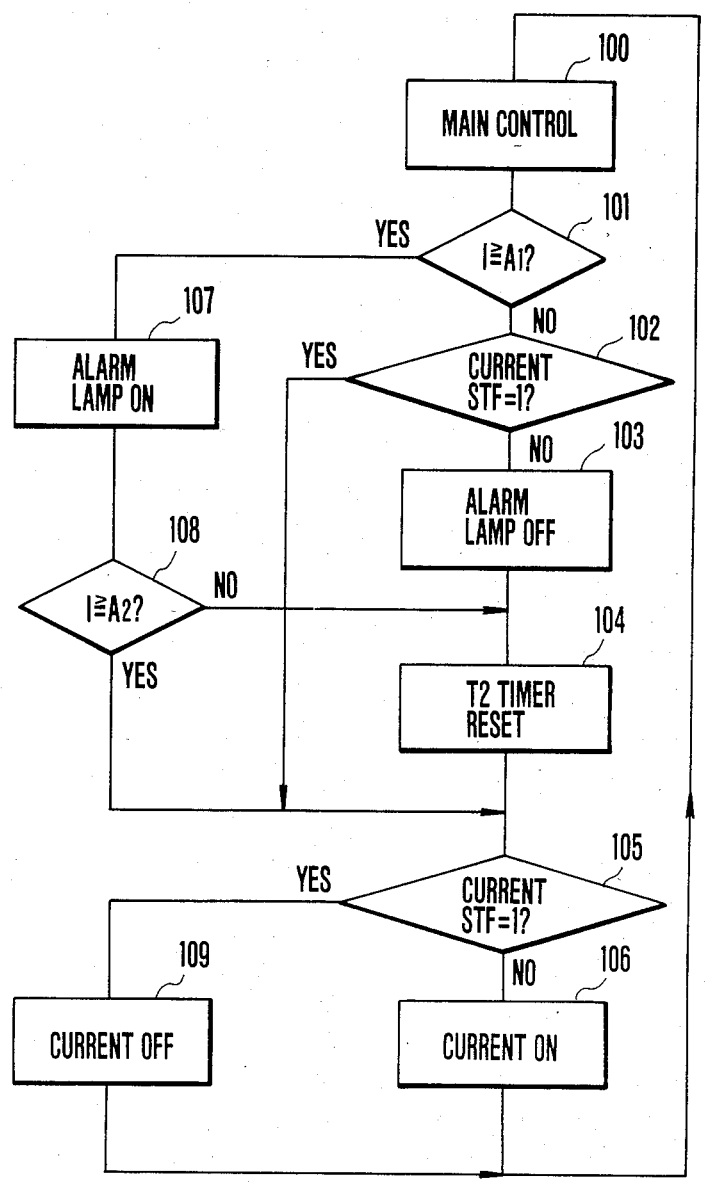
FIGS. 4A and 4B are respectively flow charts for obtaining the characteristics shown in FIG. 3.
Figure 4B:
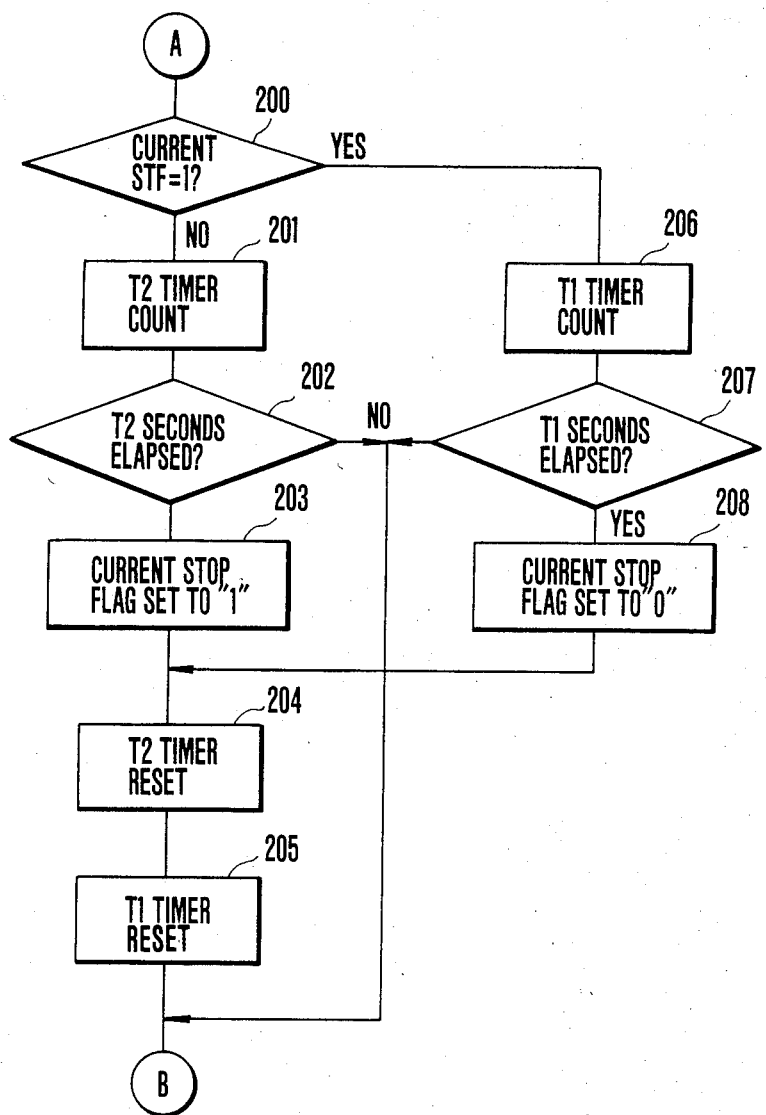

FIGS. 4A and 4B are flow charts for explaining the operation of the control section 3, in which FIG. 4A shows the main routine thereof, and FIG. 4B is a subroutine thereof. When a regular interrupt instruction is supplied to the control section 3 during the main routine, the main routine stops execution, and the flow advances to start node A of the subroutine. When the subroutine reaches end node B, the flow returns to the main routine, so that the interrupted operation is restarted.

The normal operation will be first described wherein the current flowing through the motor 2 is below A1. In step 100, the control section 3 performs "MAIN CONTROL" operation. The control circuit 38 in the control section 3 performs power steering processing. In addition to this processing, the control circuit 38 also performs other processing not pertinent to this invention. It should be noted that only components for power steering operation are illustrated in the circuit shown in FIG. 2.

In the normal operation, when the control section 3 completes the "MAIN CONTROL" in step 100, it checks in step 101 whether or not "I≧A1" is established. Since the current is less than A1, it is "NO" in step 101 and the flow advances to step 102. The control section 3 checks in step 102 whether or not "CURRENT STF=1" is established. In the normal operation, the current STF (i.e., current stop flag) is set to be logic "0". Therefore, it is "NO" in step 102, the control section 3 performs "ALARM LAMP OFF" operation in step 103 and "T2 TIMER RESET" operation in step 104. In this case, the alarm indicator 35 is kept OFF, and the T2 timer has not started counting. Neither the alarm indicator 35 nor the T2 timer in the control circuit 38 changes states after steps 103 and 104. The control section 3 then checks again in step 105 whether or not "CURRENT STF=1" is established. In this case, since "NO" in step 105, the control circuit 38 performs "CURRENT ON" operation in step 106, so that supply of current to the motor 2 is maintained. The flow then returns to step 100, and the above operation is repeated. Steps 100 to 106 thus form a loop.

When an interrupt instruction is generated while the loop of steps 100 to 106 is executed, the control circuit 38 stops the main routine and executes the subroutine in FIG. 4B. The control circuit 38 checks in step 200 whether or not "CURRENT STF=1" is established. Since the current stop flag is set to be logic "0", step 200 is determined to be "NO". The "T2 TIMER COUNT" operation in step 201 is performed. The control circuit 38 checks in step 202 whether or not "T2 TIMER ELAPSED" is established. In this case, since the T2 timer is started in step 201, a time interval T2 has not elapsed, resulting in "NO" in step 202. The flow reaches end node B and then returns to the main routine. The main routine is started, and the flow again constitutes the loop of steps 100 to 106. The T2 timer started in step 201 is reset in step 104. Therefore, in the normal operation, the loop of steps 100 to 106 of the main routine and the loop of steps 200 to 202 of the subroutine are repeated, and the control output from the circuit in FIG. 2 does not change.

A high-load operation will now be described wherein the current flowing through the motor 2 falls between A1 and A2. In this case, the control section 3 detects "YES" in step 101, and "ALARM LAMP ON" operation in step 107 is performed. For this reason, the control circuit 38 supplies the alarm signal to the alarm indicator 35 through the control circuit 39 and causes the alarm indicator 35 to be turned on. The control circuit 38 then checks in step 108 whether or not "I≧A2" is established. In this case, the current flowing through the motor 2 is equal to or less than A2, and "NO" in step 108 is established. The flow advances to step 104. Thereafter, the same operation as in the normal operation is performed. In this manner, when the high-load state is given (i.e., when condition A1≦I≦A2 is given), a loop of steps 100, 101, 107, 108, 104, 105 and 106 of the main routine and a loop of steps 200 to 202 of the subroutine are repeated. The alarm indicator 35 is turned on to indicate the high-load state.

The overload state will now be described wherein the current flowing through the motor 2 is larger than A2 and is maintained for a predetermined period of time. In this case, step 101 of the main routine is determined to be "YES", and "ALARM LAMP ON" operation in step 107 is performed. In the same manner as in the high-load state, the alarm indicator 35 is turned on. Since it is determined in step 108 that "I≧A2", it is then checked in step 105 whether or not "CURRENT STF=1" is established. Since the current stop flag is set to be logic "0", step 105 is determined to be "NO". The control circuit 38 then performs "CURRENT ON" operation in step 106 and continues to supply power to the motor 2. A loop of steps 100, 101, 107, 108, 105 and 106 of the main routine is repeated until another interrupt is generated.

When an interrupt is generated while the loop described above is being repeated, the flow advances to the subroutine. The control circuit 38 checks in step 200 whether or not "CURRENT STF=1" is established. In this case, step 200 is determined to be "NO" in the same manner as in step 105. "T2 TIMER COUNT" operation in step 201 is then performed. The control circuit 38 then checks in step 202 whether or not "T2 SECONDS ELAPSED" is established. However, the time interval T2 has not elapsed, so that step 202 is determined to be "NO". The flow returns to the main routine. As a result, the loops of the main routine and subroutine are repeated. In this case, in the main routine, "T2 TIMER RESET" operation in step 104 is not performed. Every time the subroutine processing is performed, "T2 TIMER COUNT" operation in step 201 is performed, so that the T2 timer is counted up.

The count of the T2 timer reaches T2 while the main routine and the subroutine are repeated. "T2 SECONDS ELAPSED" decision in step 202 is determined to be "YES". Therefore, the control circuit 38 performs "CURRENT STOP FLAG SET TO '1'" operation in step 203, "T2 TIMER RESET" operation in step 204, and "T1 TIMER RESET" operation in step 205. The flow then returns to the main routine. The T1 timer is reset in step 205. However, in this case, since the T1 timer is not set, it will not change its state.

When the flow returns to the main routine after the current stop flag STF is set to be logic "1", "CURRENT STF=1" decision is determined to be "YES" in step 105 and the control circuit 38 performs "CURRENT OFF" operation in step 109. For this reason, the control circuit 38 cuts off the current from the motor 2 through the control circuit 39 and the switching circuit 36. When the interrupt is generated to execute the subroutine, "CURRENT STF=1" decision in step 200 is determined to be "YES" and the control circuit 38 performs "T1 TIMER COUNT" operation in step 206. Thereafter, the control circuit 39 checks in step 207 whether or not "T1 SECONDS ELAPSED" is established. In this case, the time interval T1 has not elapsed, step 207 is determined to be "NO", and the flow returns to the main routine.

When the flow returns to the main routine, the control circuit 38 checks in step 101 whether or not "I≧A1" is established. In this case, the current is cut off from the motor 2, and step 101 is determined to be "NO". The control circuit 38 then checks in step 102 whether or not "CURRENT STF=1" has established. Since the current stop flag is set to be logic "1" in step 203, step 102 is determined to be "YES". Step 105 is determined to be "YES" in the same manner as in step 102, so that the control circuit 38 performs "CURRENT OFF" operation to cut off the current from the motor 2. Therefore, when the current is cut off from the motor 2, a loop of steps 100, 101, 102, 105 and 109 of the main routine and a loop of steps 200, 206 and 207 are repeated.

The count of the T1 timer reaches a value corresponding to the time interval T1 while the loops of the main routine and the subroutine are being repeated. Step 207 is then determined to be "YES". For this reason, the control circuit 38 performs "CURRENT STOP FLAG SET TO '0'" operation in step 208, "T2 TIMER RESET" operation in step 204 and "T1 TIMER RESET" operation in step 205. The flow then returns to the main routine.

In this case, the current stop flag is set to be logic "0", but the current cutoff operation is not yet cancelled. The "I≧A1" decision in step 101 is determined to be "NO", and the "CURRENT STF=1" decision in step 102 is determined to be "NO". The control circuit 38 performs "ALARM LAMP OFF" operation in step 103, so that the alarm indicator 35 is turned off. After "T2 TIMER RESET" operation in step 104 is performed, "CURRENT STF=1" decision in step 105 is determined to be "NO". For this reason, the control circuit 38 performs "CURRENT ON" operation in step 106, so that the current is supplied again to the motor 2. When the flow returns to step 101, the control circuit 38 checks whether or not "I≧A1" is established. If YES in step 101, the high-load state processing is performed. However, if NO in step 101, the normal operation processing is performed. When an interrupt is generated, the flow branches from the main routine to the subroutine. In this case, step 200 ("CURRENT STF=1" decision) and step 202 ("T2 SECONDS ELAPSED" decision) are both determined to be "NO". The subroutine processing influences neither the high-load state processing nor normal operation processing. In this manner, the characteristics shown as in FIG. 3 can be accomplished.

Figure 5:
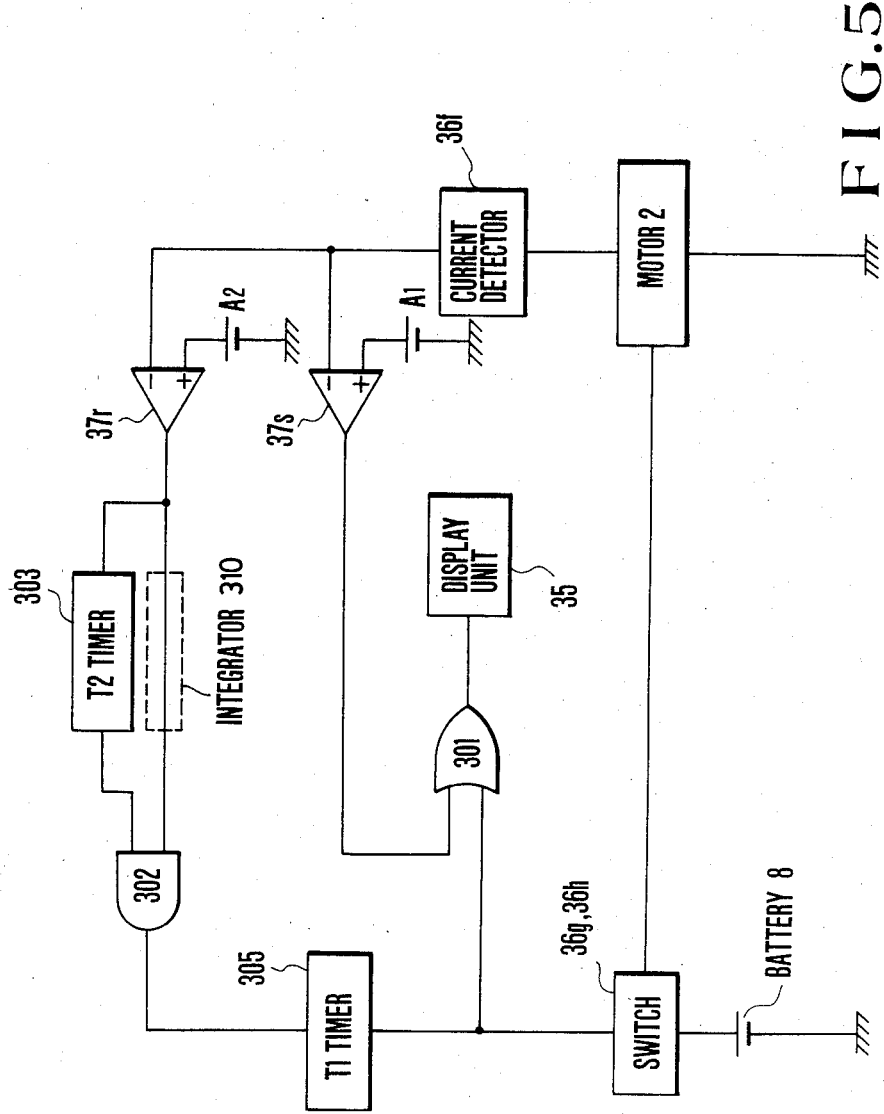
FIG. 5 shows function blocks for performing the same operation as in FIGS. 4A and 4B.

The function blocks of the embodiment described above are illustrated in FIG. 5. The same reference numerals used in FIG. 5 denote the same parts as in FIGS. 1 to 4B. Referring to FIG. 5, the motor 2 is connected to the battery 8 through a switch consisting of the transistors 36g and 36h. The magnitude of the coil bias current supplied to the motor 2 is detected by the current detector 36f. An output from the current detector 36f is supplied to one input terminal of each of the comparators 37s and 37r. The other input terminal of each of the comparators 37s and 37r receives a current value A1, A2, respectively, for determining whether or not the actual current flowing through the motor 2 is imposed with a high load. When an output from the current detector 36f exceeds the current value A1 at time t1, as shown in FIG. 3, the comparator 37s generates an output which is supplied to the alarm indicator 35 through an OR gate 301 (the actual arrangement of the control circuits 38 and 39), so that the alarm indicator 35 is turned on. Subsequently, when an output from the current detector 36f exceeds the current value A2 at time t2, the comparator 37r supplies an output to an AND gate 302 and a T2 timer 303 (the actual arrangement of the circuits 38 and 39 of FIG. 2). When the detected current exceeds the value A1, the alarm indicator 35 is continuously activated. The T2 timer 303 is started in response to the output from the comparator 37r. When the time interval T2 has elapsed, the T2 timer 303 supplies an output to the AND gate 302. When the output is generated from the timer 303 while the output is generated from the comparator 37r, the AND gate 302 is enabled to supply an output to a T1 timer 305. The T1 timer 305 is started in response to the output from the AND gate 302. The T1 timer 305 continuously generates an output to the switch (36g and 36h) for the time interval T1 so as to close it. As a result, the power is cut off from the motor 2. The output from the T1 timer 305 is supplied to the alarm indicator 35 through the OR gate 301. Even if the detected current becomes smaller than A1, the alarm indicator is kept on for the time interval T1. When the time interval T1 has elapsed, the T1 timer 305 stops generating the output, so that the switch (36g and 36h) are opened to resupply the power to the motor 2.

Figure 6:
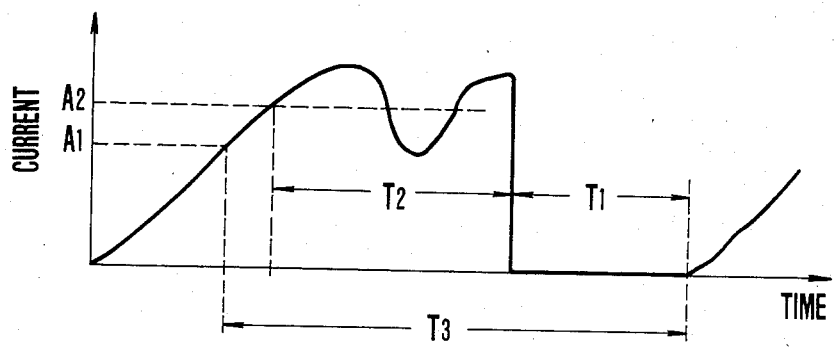
FIG. 6 is a graph showing the motor current in the power steering apparatus as a function of time when another method of controlling the apparatus is applied according to another embodiment of the present invention.

FIG. 6 is a graph showing the motor current waveform when a method of another embodiment is applied to constitute the power steering apparatus. In order to obtain the characteristics shown in FIG. 6, the control section 3 of FIG. 2 is operated as follows.

When the current flowing through the motor 2 exceeds A1, the control section 3 detects that the high-load state is set, and the alarm indicator 35 is turned on. From the time when the current flowing through the motor 2 increases and exceeds A2, the current value is integrated for the time interval T2. In this case, even if the current temporarily decreases below A2 for a short period of time, as shown in FIG. 6, integration is continued. When the integrated value exceeds a predetermined value, the operating state is detected as the overload state, and the current is cut off from the motor 2 for the time interval T1 from the end of the time interval T2.

In this case, the corresponding function blocks are substantially the same as that of FIG. 5 except that an integrator 310 is inserted between the output side of the comparator 37r and the AND gate 302 (excluding the route to the timer 303).

Figure 7A:
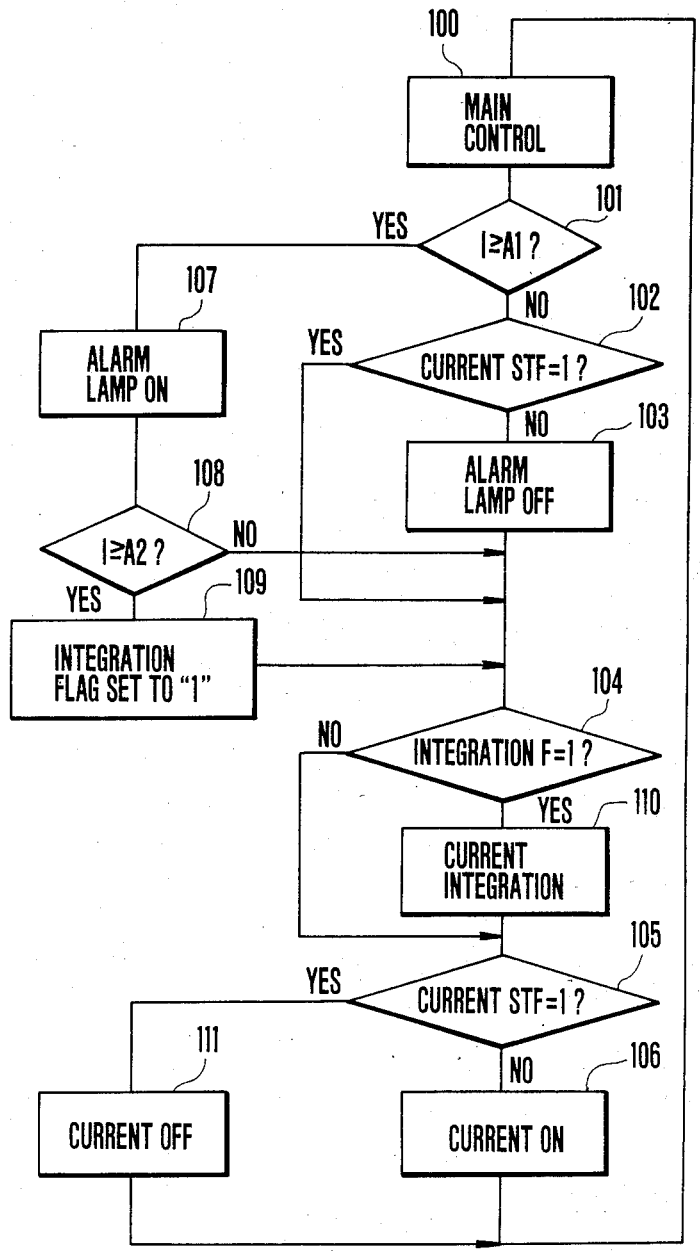
FIGS. 7A and 7B are respectively flow charts for obtaining the characteristics shown in FIG. 6.
Figure 7B:
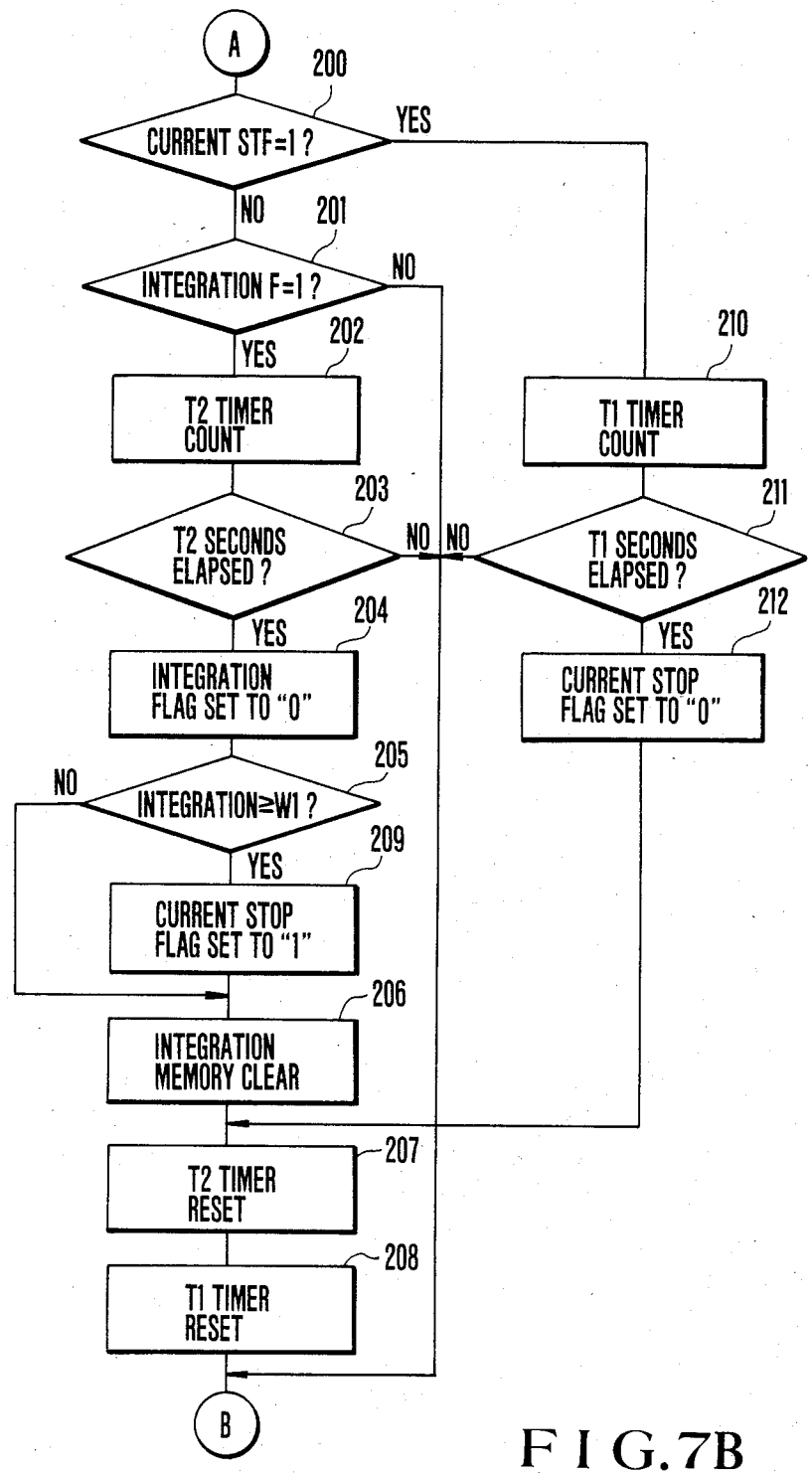

FIGS. 7A and 7B are flow charts for explaining this operation of the control section, in which FIG. 7A shows the main routine and FIG. 7B shows the subroutine. Switching between the main routine and the subroutine can be performed in the same manner as in FIGS. 4A and 4B.

The normal operation will first be described wherein the current flowing through the motor 2 is less than A1. In the main routine, the control section checks in step 101 whether or not "I≧A1" is established after "MAIN CONTROL" operation in step 100 is performed. In this case, since the current is less than A1, step 101 is determined to be "NO". The control section 3 then checks in step 102 whether or not "CURRENT STF=1" is established. In the normal operation, the current stop flag is set to be logic "0", so that step 102 is determined to be "NO". The flow advances to step 104 ("INTEGRATION F=1" decision) through step 103 ("ALARM LAMP OFF"). In this case, since integration is not performed and an integration flag (integration F) has been set to be logic "0", step 104 is determined to be "NO". The control section 3 then checks in step 105 whether or not "CURRENT STF=1" is established. Step 105 is determined to be "NO" in the same manner as in step 102. The flow returns to step 102 through "CURRENT ON" operation in step 106. The above operation is then repeated. In other words, a loop of steps 100 to 106 is repeated.

When an interrupt is generated while the loop of steps 100 to 106 is being repeated, the control section 3 stops executing the main routine. The flow advances to start node A of the subroutine in FIG. 7B. The control section 3 checks in step 200 whether or not "CURRENT STF=1" is established. In this case, since the current stop flag is set to be logic "0", step 200 is determined to be "NO". The control section 3 then checks in step 201 whether or not "INTEGRATION F=1" is established. Step 201 is determined to be "NO" in the same manner as in step 104. When the flow reaches end node B of the subroutine, the flow returns to the main routine. In the normal operation, the loop of steps 100 to 106 of the main routine and the loop of steps 200 and 201 are repeated. In this case, the control state of the power steering apparatus does not change.

The high-load state operation will now be described wherein the current flowing through the motor 2 falls between A1 and A2. In this case, step 101 ("I≧A1?") is determined to be "YES", and "ALARM LAMP ON" in step 107 is performed. For this reason, the control circuit 38 causes the alarm indicator 35 to be turned on through the control circuit 39, thereby indicating the high-load state. The control section 3 then checks in step 108 whether or not "I≧A2" is established. In this case, since the current flowing through the motor 2 is less than A2, step 108 is determined to be "NO" and the flow advances to step 104. Thereafter, the same operation as in the normal operation processing is performed. When the current I flowing through the motor 2 satisfies the condition A1≦I≦A2, the loop of steps 100, 101, 107, 108, 104, 105 and 106 of the main routine and the loop of steps 200 and 201 of the subroutine are repeated. As a result, the alarm indicator 35 is turned on to indicate the high-load state.

The overload operation processing will now be described wherein the current flowing through the motor 2 exceeds A2 and the integrated value of the current exceeds the predetermined value. In this case, step 101 of the main routine is determined to be "YES", so that "ALARM LAMP ON" in step 107 is performed. The alarm indicator 35 is turned on in the same manner as in the high-load state. When the control section 3 determines in step 108 whether or not "I≧A2" is established, step 108 is determined to be "YES", so that "INTEGRATION FLAG SET TO "1"" operation in step 109 is performed. Thereafter, the flow advances to step 104, and the control section 3 checks in step 104 whether or not "INTEGRATION F=1" is established. Since the integration flag is set to be logic "1" in step 109, step 104 is determined to be "YES". "CURRENT INTEGRATION" operation in step 110 is performed. The value of a current flowing through the motor 2 is added to a time interval during which the current flows. The "CURRENT STF=1" decision in step 105 is determined to be "NO", and the "CURRENT ON" operation in step 106 is performed. The flow then returns to step 100. A loop of steps 100, 101, 107, 108, 109, 104, 110, 105 and 106 of the main routine is repeated until an interrupt is generated.

When the interrupt instruction is generated while the loop of the main routine is being repeated, the flow advances to the subroutine. The control section 3 checks in step 200 whether or not "CURRENT STF=1" is established. Step 200 is determined to be "NO", and the control section 3 checks in step 201 whether or not the "INTEGRATION F=1" is established. Since the integration flag is set to be logic "1" in step 109, step 201 is determined to be "YES". The flow advances to step 202 wherein the "T2 TIMER COUNT" operation is performed. In other words, the T2 timer in the control circuit 38 is started. The control section 3 checks in step 203 whether or not "T2 SECONDS ELAPSED" is established. Since the time interval T2 has not elapsed, step 203 is determined to be "NO". The flow then returns to the main routine. As a result, the loops of the main routine and the subroutine are repeated. In this case, every time the subroutine processing is performed, the "T2 TIMER COUNT" operation in step 202 is performed, so that the T2 timer is counted up.

The count of the T2 timer reaches a value corresponding to the time interval T2 while the loops of the main routine and the subroutine are repeated. When the time interval T2 has elapsed, step 203 is determined to be "YES". The "INTEGRATION FLAG SET TO "0"" operation in step 204 is performed. The control section 3 then checks in step 205 whether or not the integrated value has reached a predetermined value W1 (i.e., "INTEGRATION≧W1?"). In this case, if NO in step 205, the overload state is not set. Therefore, step 206 ("INTEGRATION MEMORY CLEAR" operation), step 207 ("T2 TIMER RESET" operation), and step 208 ("T1 TIMER RESET" operation) are sequentially performed, and the flow returns to the main routine. In this case, the control section 3 checks whether the high-load state or the overload state is set in accordance with the magnitude of the current flowing through the motor 2 on the basis of the determination of step 101 ("I≧A1?"). Thereafter, the high-load state processing or the normal operation processing is performed in the subsequent steps.

On the other hand, if YES in step 205 ("INTEGRATION≧W1?"), the "CURRENT STOP FLAG SET TO "1"" operation in step 209 is performed. Thereafter, the "INTEGRATION MEMORY CLEAR", "T2 TIMER RE-SET" and "T1 TIMER SET" operations in steps 206 to 208 are sequentially performed, and the flow returns to the main routine.

When the flow returns to the main routine after the current stop flag is set to be logic "1", step 105 ("CURRENT STF=1?") is determined to be "YES". The "CURRENT OFF" operation in step 111 is performed. For this reason, the control circuit 38 controls to cut off the current supply to the motor 2 through the control circuit 39 and the switching circuit 36. When the flow advances to the subroutine, step 200 ("CURRENT STF=1?") is determined to be "YES", and the "T1 TIMER COUNT" operation in step 210 is performed. Thereafter, the control section 3 checks in step 211 whether or not "T1 SECONDS ELAPSED" is established. In this case, the time interval T1 has not elapsed, step 211 is determined to be "NO", and the flow returns to the main routine.

When the flow returns to the main routine, the control section 3 checks in step 101 whether or not "I≧A1" is established. In this case, the power is cut off from the motor, so that step 101 is determined to be "NO". The control section 3 then checks in step 102 whether or not "CURRENT STF=1" is established. The current stop flag is set to be logic "1" in step 209, so that step 102 is determined to be "YES". In addition, since the integration flag "0" is set in step 204, step 104 ("INTEGRATION F=1?") is determined to be "NO". The next step 105 ("CURRENT STF=1?") is determined to be "YES"in the same manner as in step 102. The control section 3 performs the "CURRENT OFF" operation in step 111. The motor is kept off. Therefore, when the current supply to the motor 2 is cut off, a loop of steps 100, 101, 102, 104, 105 and 111 of the main routine and a loop of steps 200, 210 and 211 of the subroutine are repeated.

The count of the T1 counter reaches a value corresponding to the time interval T1 while the loops of the main routine and the subroutine are being repeated. As a result, step 211 ("T1 SECONDS ELAPSED?") is determined to be "YES". The control section 3 then performs the "CURRENT STOP FLAG SET TO "0"" in step 212, the "T2 TIMER RESET" operation in step 207, and the "T1 TIMER RESET" operation in step 208. The flow then returns to the main routine.

In this case, the motor 2 is still kept OFF, step 101 ("I≧A1?") is determined to be "NO". In addition, since the current stop flag is set to be logic "0", step 102 ("CURRENT STF=1?") is determined to be "NO". The control section 3 performs the "ALARM LAMP OFF" operation in step 103. The alarm indicator 35 is thus turned off. Step 104 ("INTEGRATION F=1?") and step 105 ("CURRENT STF=1?") are both determined to be "NO". The control section 3 performs the "CURRENT ON" operation in step 106. The motor 2 is thus restarted. When the flow returns to step 101 of the main routine, the control section 3 checks whether or not "I≧A1" is established. If YES in step 101, the high-load state processing is performed. Otherwise, the normal operation processing is performed. When an interrupt instruction is generated while the main routine is being executed, the flow advances to the subroutine. Step 200 ("CURRENT STF=1?") and step 201 ("INTEGRATION F=1?") are both determined to be "NO". The subroutine operations do not change the control state of the power steering apparatus.

Figure 8:
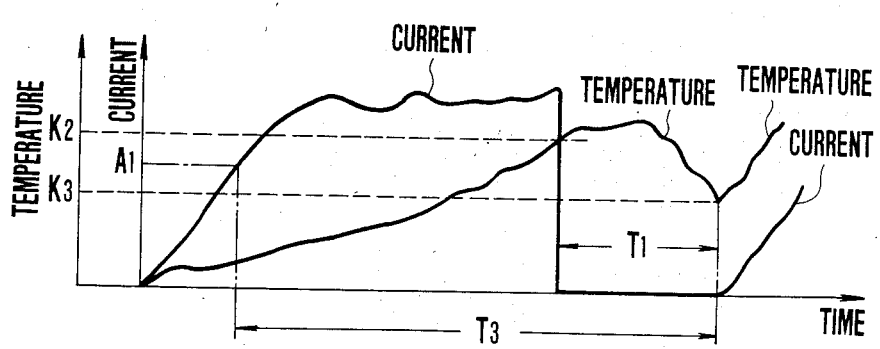
FIG. 8 is a graph showing the motor current in the power steering apparatus as a function of time when still another method of controlling the apparatus is applied according to still another embodiment of the present invention.

FIG. 8 is a graph showing the motor current and the motor temperature or the temperature of the motor control transistor when a method of still another embodiment is applied to the power steering apparatus. In order to obtain the characteristics in the graph, the control section 3 of FIG. 2 is operated as follows.

When the current flowing through the motor 2 exceeds A1, the control section 3 determines that the high-load state is set and causes the alarm indicator 35 to be turned on. When the motor temperature or the temperature of the motor control transistor (to be referred to the motor temperature for brevity hereinafter) exceed K2, the control section determines that the overload state is set and cuts off power supply to the motor. The control section 3 then checks whether or not the motor temperature is less than K3 (K3<K2) when a cutoff interval T1 has elapsed. If the motor temperature is actually less than K3, the motor is restarted.

Figure 9A:
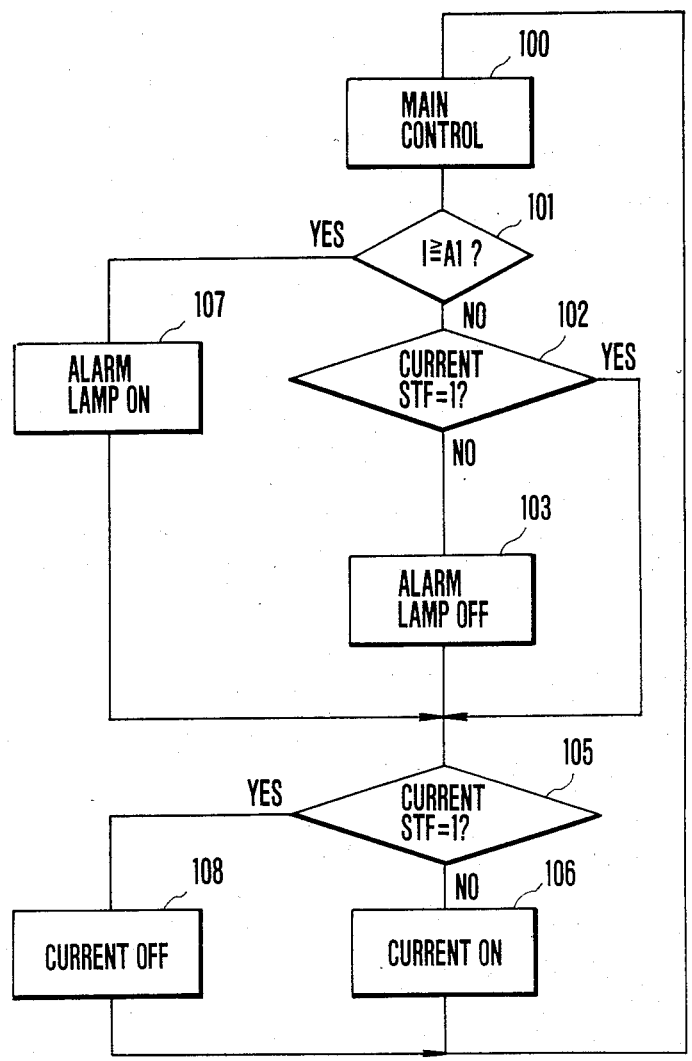
FIGS. 9A and 9B are respectively flow charts for obtaining the characteristics shown in FIG. 7.
Figure 9B:
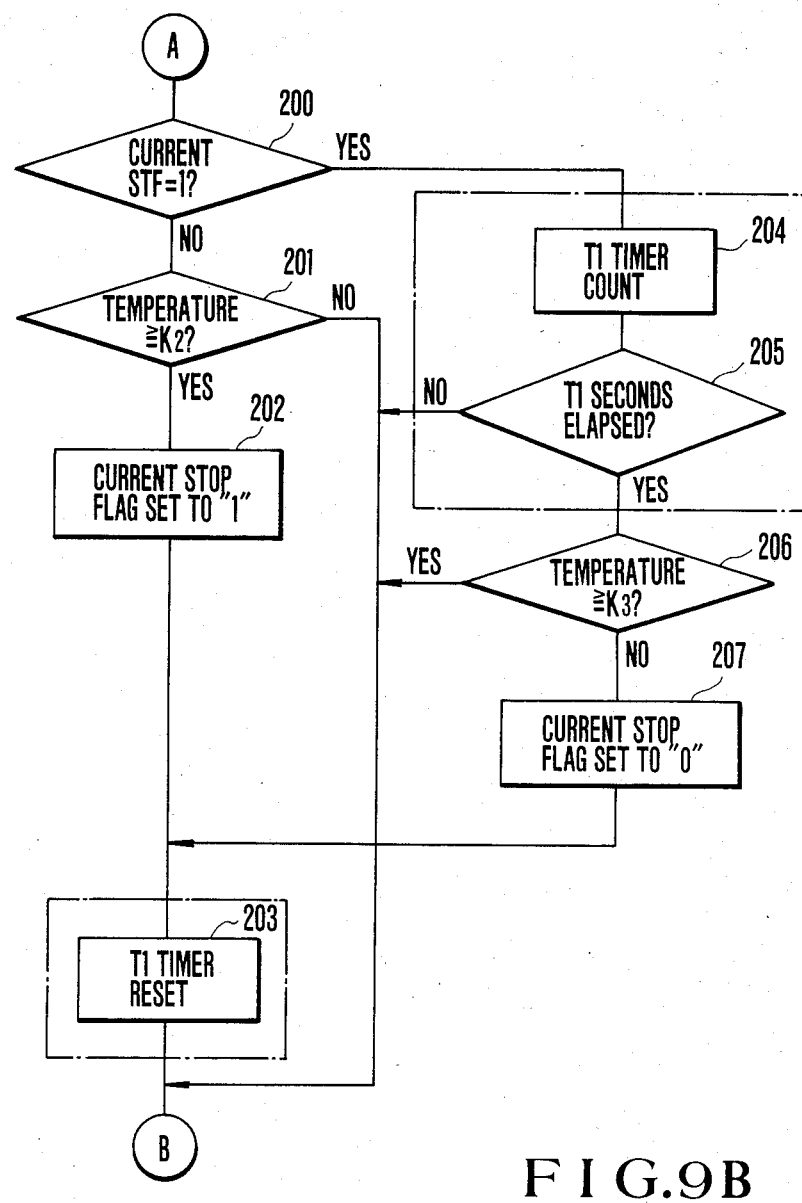

FIGS. 9A and 9B are respectively flow charts for explaining the operation of the control section 3, in which FIG. 9A shows the main routine thereof, and FIG. 9B shows the subroutine. The main routine is transferred to the subroutine under the same condition as in FIGS. 4A and 4B.

Referring to FIG. 9A, the main routine is a flow consisting of processing for determining whether the normal operation state or the overload state is set, processing for turning on/off the alarm indicator 35, and processing for supplying/interrupting the current flowing through the motor. Referring to FIG. 9B, the subroutine is a flow consisting of processing for determining whether or not the overload state is set, processing for determining the current off period, and processing for determining whether or not the current is resupplied to the motor. The detailed operations in the steps are substantially the same as those of FIGS. 4A and 4B and FIGS. 7A and 7B. When the alternate long and short dashed line is omitted, the restart time of the motor can be determined in accordance with the motor temperature irrespective of the current stop time.

FIG. 10 shows function blocks of the embodiment shown in FIG. 8 and FIGS. 9A and 9B. The same reference numerals used in FIG. 10 denote the same parts as in FIG. 5. A temperature detector 350 as the main feature of this embodiment detects changes in temperature of the transistor for controlling the motor 2. An output from the temperature detector 350 is supplied to comparators 351 and 352.

When a current larger than A1 flows through the motor coil and is detected by the current detector 36f, the alarm indicator 35 is driven through the OR gate 301. When an output from the temperature detector 350 represents a value higher than K2, the comparator 351 generates an output which indicates that the overload state is set.

The output from the comparator 351 is supplied to a T1 timer 353 and a flip-flop 356. The flip-flop 356 is set to supply a Q output to the switch (36g and 36h), thereby stopping the supply of power from the power supply to the motor 2. When the T1 timer 353 receives the output from the comparator 351, the T1 timer 353 is started. When the time interval T1 has elapsed, the T1 timer 353 supplies an output to an AND gate 354. The switch (36g and 36h) is kept off for the time interval T1. When the output from the temperature detector 350 represents the value corresponding to K3 (K3<K2), the AND gate 354 is enabled to reset the flip-flop 356. As a result, when the output from the temperature detector 350 represents a value higher than K3, the comparator 352 generates the output. Therefore, an inverter 355 does not generate an output.

When the output from the temperature detector 350 represents a value lower than the temperature K3, the comparator 352 does not supply an output to the inverter 355. Therefore, the inverter 355 supplies an output of logic "1" to the AND gate 354.

Returning to the above description, when there is an output from the T1 timer 353 and the temperature detector 350 generates an output representing a value lower than the temperature K3, the inverter 355 generates the output of logic "1". As a result, the AND gate 354 is enabled to gate the output, thereby resetting the flip-flop 354. The switch (36g and 36h) is opened again to resupply the power to the motor 2.

When the T1 timer 353 generates the output and the temperature detector 350 generates the output representing a value higher than the temperature K3, the AND gate 354 is not enabled, and the switch (36g and 36h) is kept closed. The AND gate 354 will not be enabled until the detected temperature becomes less than K3. Meanwhile, the timer 353 continuously generates the output. The timer 353 is reset when the comparator 352 generates the output or at proper time thereafter.

The high-load state and the normal operation state are determined by the motor current in the first and second embodiments. As is apparent from the third embodiment, the high-load state and the normal operation state can be determined by the motor temperature or the temperature of the transistor for controlling the motor current. The current off period can be determined in accordance with the minimum current during the overload determining period. The alarm indicator 35 may be turned on only during the current off period. In this case, the alarm indicator 35 indicates that the power steering operation is not performed. It should be noted that a temperature sensor for detecting a temperature of the transistor can be used when the operating state is detected by the motor temperature or by the temperature of the transistor for controlling the motor current. The output from the temperature sensor is supplied to the control circuit 38. In the power steering device, the driving force of the motor 2 is transmitted to the steering section 1 through the oil pump 2a. However, the driving force of the motor 2 can also be directly transferred to the steering section 1.

The present invention is not limited to the above embodiments. Various changes and modifications may be made within the spirit and scope of the invention.

According to the present invention, there is provided a method and device for controlling a power steering apparatus, wherein an alarm signal is generated when the power steering apparatus is imposed with a high load, and the motor current is cut off for a predetermined period of time when the power steering apparatus is overloaded. Therefore, even if a power steering apparatus of short-term maximum output rating is abnormally operated for a long period of time, trouble will not occur. In this manner, the driver knows that the power steering apparatus is abnormally operated, thereby stopping the abnormal operation.

What is claimed is:

1. A device for controlling a power steering apparatus having an oil pump driven by a motor, said device comprising:
   first detecting means for detecting that the motor is imposed with a high load;
   second detecting means for detecting that the motor is imposed with an overload;
   an alarm unit for generating an alarm in response to an output from said first detecting means; and
   controlling means for inhibiting supply of current to the motor for a predetermined period of time upon reception of an output from said second detecting means and for enabling supply of current to the motor after said predetermined period of time has elapsed, said controlling means including a timer for generating an output when a time interval has elapsed after said second detecting means generates an output, an integrator for integrating the output from said second detecting means, an AND gate for receiving outputs from said timer and said integrator, and means for opening a switch inserted between the motor and a power supply for the predetermined period of time in response to an output from said AND gate.

2. A device according to claim 1, wherein said first and second detecting means include a current detector for detecting a motor bias current.

3. A device according to claim 1, wherein said first detecting means comprises a current detector for detecting a motor bias current, and said second detecting means comprises a temperature detector for detecting a motor temperature.

4. A device according to claim 1, wherein said controlling means comprises discriminating means for detecting that said second detecting means still generates an output even when a time interval has elapsed after said second detecting means generates the output, and means for opening a switch inserted between the motor and a power supply for the predetermined period of time.

5. A device for controlling a power steering apparatus having an oil pump driven by a motor, said device comprising:

first detecting means for detecting that the motor is imposed with a high load;

second detecting means for detecting that the motor is imposed with an overload;

an alarm unit for generating an alarm in response to an output from the first detecting means;

controlling means for inhibiting supply of current to the motor for a predetermined period of time upon reception of an output from said second detecting means and for enabling supply of current to the motor after said predetermined period of time has elapsed; and third detecting means for detecting that the power steering apparatus is not set in a high-load state when the predetermined period of time has elapsed;

said controlled means continuously de-energizing the motor unless said third detecting means generates an output.

6. A device for controlling a power steering apparatus having an oil pump driven by a motor, said device comprising:

first detecting means for detecting that the motor is imposed with a high load;

second detecting means for detecting that the motor is imposed with an overload;

an alarm unit for generating an alarm in response to an output from said first detecting means;

controlling means for inhibiting supply of current to the motor for a predetermined period of time upon reception of an output from said second detecting means and for enabling supply of current to the motor after said predetermined period of time has elapsed; and third detecting means for detecting that the power steering apparatus is not set in a high-load state when the predetermined period of time has elapsed;

said controlling means further comprising a timer for generating an output when a time interval has elapsed after said second detecting means generates an output, a flipflop which is set in response to the output from said second detecting means, and a gate for generating an output in response from the output from said timer unless said third detecting means does not generate an output, said flipflop being provided with means for opening a switch inserted between the motor and a power supply until said flipflop is set.

* * * * *